United States Patent [19]

Gliemeroth et al.

[11] 4,017,291
[45] Apr. 12, 1977

[54] PROCESS FOR THE TREATMENT OF GLASS BY METAL MIGRATION

[75] Inventors: Georg Gliemeroth, Finthen; Lothar Meckel, Ostrich, both of Germany

[73] Assignee: Jenaer Glaswerk Schott & Gen., Mainz, Germany

[22] Filed: June 10, 1976

[21] Appl. No.: 694,595

[30] Foreign Application Priority Data

June 16, 1975 Germany .................. 2526804

[52] U.S. Cl. .............. 65/30 R; 65/60 C; 427/383 B

[51] Int. Cl.² .................. C03C 21/00

[58] Field of Search ......... 65/30 R, 30 E, 32, 60 C, 65/66; 427/383 B, 166, 167, 291

[56] References Cited

UNITED STATES PATENTS

| | | |
|---|---|---|
| 3,615,318 | 10/1971 | Jagodzinski et al. ......... 65/60 C X |
| 3,773,487 | 11/1973 | Plumat et al. ............... 65/30 E |
| 3,798,016 | 3/1974 | Ormesher et al. ............ 65/30 E X |
| 3,900,305 | 8/1975 | DeLuca ....................... 65/30 R |
| 3,938,977 | 2/1976 | Gliemeroth ................. 65/30 R |
| 3,961,926 | 6/1976 | Asam .......................... 427/166 X |
| 3,971,645 | 7/1976 | Bachmann et al. ........... 65/60 C X |

*Primary Examiner*—S. Leon Bashore
*Assistant Examiner*—Kenneth M. Schor
*Attorney, Agent, or Firm*—Stanley D. Schwartz

[57] ABSTRACT

A process for the treatment of glass to modify various properties thereof. The process comprises the steps of applying a coating of at least one metal, preferably by vapor deposition, onto the surface of a $SiO_2$ containing glass. The coated glass is thereafter heated to a temperature sufficient to cause the metal to migrate from the surface of the glass into the glass without any residue or coating remaining on the surface of the glass.

16 Claims, No Drawings

PROCESS FOR THE TREATMENT OF GLASS BY METAL MIGRATION

BACKGROUND OF THE INVENTION

The invention broadly relates to a process for treating glass in order to vary the physical, optical and chemical properties of the glass and more particularly to a process for applying a metal to a glass wherein said metal is incorporated therein without any residue remaining on the surface of said glass. The metal reacts in such a way with the glass so that the composition of the glass is changed in the region where this metal is incorporated, thereby resulting in a change in the properties of the glass which differ from those of the glass prior to treatment.

Various processes are known in the prior art for changing properties of a glass, such as the strength of a glass, for example, which can be accomplished by an ion-exchange process whereby metal ions are allowed to diffuse into a glass. This diffusion process takes place at elevated temperatures, usually in the range of the transformation temperature which is either just below this temperature (no less than 100° C) or above this temperature (no greater than 300° C). In addition to the strength of the glass, other properties of the initial glass can be modified in the diffusion range, including the surface tension, linear thermal expansion, electrical resistivity, the refractive index for various light wavelengths, dispersion, light permeability, chemical resistivity to acids, caustic solutions and other liquids, the tendency to crystallisation, the relaxation properties and the dependence of viscosity on the temperature.

In all of these prior art processes, the materials containing cations of the components to be used for the diffusion of desired components, whether used either as a salt melt, or as a solid mixture, such as a dried clay-metal salt suspension, are brought into contact with the surface of the glass. The cations that are present in an ionic bond tend to diffuse into the interior of the glass.

The prior art ion exchange processes are characterized by the exchange of cations; i.e., with ion exchange processes, cations emerge from the glass and other cations originating from a medium surrounding the glass migrate into the glass and occupy the positions of the ions which have migrated from the glass.

A significant disadvantage of the ion-exchange process is that it is not possible to modify the properties of glasses in very small regions because the simplest and least expensive process involving the dipping of the desired portion of the glass into salt melts for the ion exchange, does not permit the modification of only small regions of the glass portion when contacted with the ions, e.g., sodium ions or potassium ions.

Consequently, a need exists to find a process for treating glass surfaces in a simple and efficient manner and in a particularly defined region whereby the properties as a whole or in part can be modified by any subsequent or simultaneous simple processes. Available as such simple, simultaneous or subsequent processes are tempering processes (temperature conditions defined as a function of time).

OBJECTS OF THE INVENTION

It is therefore a significant object of the present invention to provide a process for treating glass compositions in order to vary physical, optical and chemical properties of the glass. A closely related and yet further significant object of the present invention is the provision of a process for treating the surface of a glass whereby the properties of the glass, in a particularly defined region can be modified in whole or in part.

A further object of this invention is a process for changing properties of a glass which could only be achieved by ion-exchange processes prior thereto.

A still further object of this invention is the provision of a process for modifying the properties of a glass that can subsequently be subjected to tempering processes without any deleterious effect on the modified properties of the glass composition.

Another object of the present invention is the provision of a process capable of producing mono-dimensional refractive index gradients in glass depths of up to at least 1000 $\mu$m wherein the curve of the refractive index is usually parabolic.

Still another object of the present invention is a process that is capable of modifying various properties of a glass composition including, for example, linear thermal expansion, electrical resistivity, refractive index, dispersion, chemical stability, tendency of the glass to crystallize, relaxation properties and viscosity.

BRIEF SUMMARY OF THE INVENTION

Briefly, this invention relates to a process for the treatment of glass for the purpose of varying properties of the glass and comprising the steps of coating a metal onto the surface of the glass and thereafter heating the metal coating and glass to a temperature sufficient to cause the metal to migrate from the surface of the glass into the interior of the glass.

Unlike prior art methods, e.g., ion-exchange processes, when the metal is coated onto the surface of a glass, the metal migrates from the surface of the glass into the interior of the glass, no residue or other material remains on the surface of the glass. Thus, the entire metal coating is caused to become concentrated in the glass. When metals have been applied to the surfaces of glasses in the prior art, the glasses have been found to be somewhat resistant to liquid and solid metals coated thereon. It is possible that these metals might indeed contaminate the glass surface, but this type of contamination is not a true penetration of the metals beyond a depth of about 10 $\mu$m.

The prior art also appeared to discourage the use of certain metals, e.g., sodium, which are regarded as being very reactive elements, particularly with oxygen and therefore have been excluded from prior art coating processes. (Walter De Gruyter & Co., Berlin, 57 — 70th Edition, 1964, page 423).

DETAILED DESCRIPTION OF THE INVENTION

The coating of metal applied to the glass can be by any known procedure including sputtering, and is preferably applied by a vapor-coating procedure utilizing conventional vapor-coating apparatus and when the appropriate metals are used in conjunction therewith, no residues remain on the surface of the glass when the coated glass is subjected to a temperature sufficient to cause said metal to migrate from the surface of said glass into said glass without any residue remaining on the surface of said glass, since all the vapor-coated metal is introduced into the glass, thereby resulting in a modification of the composition of the glass in the interior.

The metal coatings are generally applied to the glass substrate in an amount sufficient to provide a film or coating having a thickness between about 10 and 1000, and preferably between 50 and 500 μm.

The vapor-coating of a top metal layer onto a glass surface can be carried out with a conventional vapor-coating apparatus and conventional vapor-coating techniques using the same. When working in accordance with the invention, three different methods were concurrently employed for this purpose:

For relatively small areas of 10 cm² on a glass surface, a vacuum plant made by Messrs. Edwards, Type 6 E4, having a molybdenum boat and a fixed object support, was used. The vacuum was produced with an insertion backing pump and an oil diffusion pump. By means of an additional freezing arrangement, this installation reached a vacuum of $10^{-5}$ mm Hg.

For larger areas up to about 60 × 60 cm on a glass surface, a vacuum plant made by Balzers Company of the type BA 502 was used. It had 6 tungsten boats, rotating object supports and a substrate heating means. The measurement of the thicknesses of the coating to be applied could be effected in this installation by means of vibrating quartz elements. A flash vaporizer was additionally incorporated. The vacuum was produced with an insertion backing pump and an oil diffusion pump, and vacuums up to $10^{-6}$ and $10^{-5}$ mm Hg could be achieved.

In addition, a self-established vacuum level, with additional receptacles, was used, consisting of an oil backing pump and a Schott mercury diffusion pump. Leybold-Heraeus boats were used as vaporizers. With this installation, the use of a double cooling trap for liquid air provided for a vacuum of $10^{-5}$ mm Hg.

Prior to coating a glass surface, it is necessary for the glass surfaces to be extremely well cleaned. To achieve this, the glass on which the top metal layer is to be deposited is, for example, etched with an acid. For example, it is possible to use either mixtures of sulphuric acid and hydrofluoric acid (preferably in a 1 to 1 ratio) or mixtures of sulphuric acid and hydrochloric acid (preferably in a 2 to 1 ratio) or chromosulphuric acid. Other possible cleaning methods are provided by the use of organic flushing agents, with and without additional ultrasonic cleansing. The etched surface is thereafter dried, preferably with pure nitrogen. An additional warming of the surface can further improve the cleanliness thereof.

In order to obtain a particularly clean top metal layer, which similarly facilitates the formation of a residue-free glass surface, the metal to be applied preferably by vapor-coating may be pre-distilled. For this purpose, the metal is distilled over a reaction flask, which is connected with a U-section consisting of borosilicate glass to a second flask. This process can be repeated several times, so that the impurities of the metal to be used for the top metal layer can be considerably reduced. By using suitable temperatures during the distillation process, it is, for example, possible for heavy metals, e.g., cobalt, chromium, copper, iron, mickel, or vanadium, which have considerably higher melting temperatures than the metals according to the invention, to be reduced until in the parts per billion (ppb) range. The pure metal obtained in this way can thereafter be vapor-coated onto the glass surface.

In addition, anions which can similarly contaminate the metal as a result of the use of self-installed vacuum pump arrangement for providing vapor-coating possibilities, are gettered. For this purpose, after the metal to be applied by vapor-coating is vaporized, it is conducted through a tube that is partially filled with a suitable getter. Molybdenum could be used as getter material for nitrogen, which was mainly observed as impurity.

The metals useful in the practice of this invention are those metals that can be applied to the surface of the glass in the form of a metal film or mirror and which can thereafter migrate into the glass without leaving any residue on the surface thereof. Many metals, e.g., cobalt, tin, tellurium, iron, nickel, copper, chromium and vanadium are not useful in the practice of this invention because metallic reflecting layers or oxide skins of these metals remain thereon after a tempering process. The metals particularly useful in carrying out this invention are those metals wherein the difference between the vaporization temperature and melting temperature is at least 350° C and the vaporization temperature of the particular metal is no greater than 1530° C. These metals generally melt between 29° and 850° C under normal pressure and vaporize between 670° and 1527° C under normal pressure. The metals having the large difference between the melting temperature and vaporization temperature is necessary for successfully carrying out the process of this invention.

The metals useful in the practice of this invention include the following:

TABLE I

| Metal | Melting temp. $T_s$ in ° C | Vaporization temp. $T_v$ in ° C | $T_v - T_s$ in degrees |
|---|---|---|---|
| lead | 327 | 1515 | 1188 |
| tellurium | 302 | 1462 | 1160 |
| lithium | 179 | 1317 | 1138 |
| sodium | 98 | 883 | 785 |
| potassium | 62 | 760 | 698 |
| barium | 850 | 1527 | 677 |
| rubidium | 39 | 700 | 661 |
| cesium | 29 | 670 | 641 |
| strontium | 774 | 1366 | 592 |
| zinc | 419 | 907 | 488 |
| magnesium | 651 | 1107 | 456 |
| cadmium | 321 | 768 | 447 |
| calcium | 848 | 1240 | 392 |

The aforementioned metals which, when preferably vaporized under vacuum, then condensed on the surface of a glass and subsequently subjected to a heat treatment at a high temperature, will result in the migration of the metal into the glass without any residue remaining on the surface of the glass. Once heated for a sufficient time, the entire metal coating is concentrated to thin the glass. The melting and vaporization temperatures for the metals useful in the practice of this invention are set forth in *Handbook of Chemistry and Physics*, 45th edition, 1965, The Chemical Rubber Company, Cleveland, Ohio.

The process of this invention is particularly useful when the metals are applied to glasses containing at least about 40 weight percent $SiO_2$. The glass compositions particularly suitable for this purpose comprise:

| | Percent by Weight |
|---|---|
| $SiO_2$ | 40 to 100 |
| $B_2O_3$ | 0 to 30 |
| $P_2O_5$ | 0 to 11 |
| $Al_2O_3$ | 0 to 25 |
| $ZrO_2$ | 0 to 6 |
| $La_2O_3$ | 0 to 12 |

-continued

| | Percent by Weight |
|---|---|
| MgO | 0 to 15 |
| CaO | 0 to 21 |
| SrO | 0 to 8 |
| BaO | 0 to 26 |
| ZnO | 0 to 20 |
| PbO | 0 to 50 |
| $TiO_2$ | 0 to 20 |
| $Li_2O$ | 0 to 15 |
| $Na_2O$ | 0 to 30 |
| $K_2O$ | 0 to 35 |

The heat treatment step is generally carried out in the range between 260° and 1850° C, depending on glass composition, and for a period of time between 1 minute and 136 hours. The heat conditions and more particularly the adaptation of the tempering time to the tempering temperature, depend on the viscosity properties of the glass being actually used.

Suitable conditions for the temperature treatment are hereinafter given as examples for different glass compositions set forth in Table II.

TABLE II

| Oxides | Examples of suitable glass compositions in % by wt. | | | | | | | | |
|---|---|---|---|---|---|---|---|---|---|
| | 1 | 2 | 3 | 4 | 5 | 6 | 7 | 8 | 9 |
| $SiO_2$ | 40.10 | 40.20 | 40.50 | 42.30 | 43.00 | 53.40 | 55.80 | 55.40 | 61.00 |
| $B_2O_3$ | — | — | — | 13.90 | — | 8.40 | 17.10 | 29.40 | — |
| $P_2O_5$ | 0.50 | — | — | 1.00 | 10.50 | — | — | — | — |
| $Al_2O_3$ | — | — | 10.00 | — | 24.50 | 14.30 | 1.10 | 1.70 | — |
| $ZrO_2$ | — | 5.50 | — | 2.00 | — | — | — | — | — |
| $La_2O_3$ | — | — | — | 11.80 | 0.50 | — | — | — | — |
| MgO | — | — | — | — | — | 1.60 | — | — | — |
| CaO | 5.60 | — | — | — | — | 20.90 | — | — | — |
| SrO | 1.60 | 1.00 | — | — | — | 1.10 | — | — | 7.80 |
| BaO | 25.20 | — | — | — | — | — | 21.70 | — | — |
| ZnO | 5.00 | — | — | 9.00 | 3.00 | — | — | — | 19.50 |
| PbO | 18.50 | — | 49.50 | 20.00 | — | — | — | — | — |
| $TiO_2$ | — | 19.10 | — | — | — | — | — | — | — |
| $Li_2O$ | — | — | — | — | 5.00 | 0.30 | — | — | — |
| $Na_2O$ | 3.50 | — | — | — | 13.50 | — | — | — | — |
| $H_2O$ | — | 34.20 | — | — | — | — | 6.30 | 13.50 | 11.70 |

| Oxides | 10 | 11 | 12 | 13 | 14 | 15 | 16 | 17 | 18 |
|---|---|---|---|---|---|---|---|---|---|
| $SiO_2$ | 64.50 | 65.50 | 66.00 | 69.00 | 70.00 | 71.00 | 80.00 | 92.50 | 100.00 |
| $B_2O_3$ | — | — | — | 0.50 | 4.50 | 6.00 | 11.50 | — | — |
| $P_2O_5$ | — | — | — | — | — | — | — | — | — |
| $Al_2O_3$ | — | 5.60 | 2.20 | — | — | 1.00 | 2.50 | — | — |
| $ZrO_2$ | — | — | — | — | — | — | 1.00 | — | — |
| $La_2O_3$ | 6.00 | 0.30 | — | — | — | — | — | — | — |
| MgO | — | — | 14.80 | 0.45 | 11.00 | — | — | — | — |
| CaO | — | 2.20 | — | 6.90 | — | — | — | — | — |
| SrO | — | — | — | — | — | — | — | — | — |
| BaO | — | — | — | 2.35 | — | — | 0.50 | — | — |
| ZnO | — | 8.30 | — | 3.75 | — | — | — | — | — |
| PbO | — | 1.00 | — | — | — | — | — | — | — |
| $TiO_2$ | — | — | — | 0.30 | — | — | — | — | — |
| $Li_2O$ | — | — | — | — | 14.50 | — | — | — | — |
| $Na_2O$ | 29.50 | 5.80 | — | 8.00 | — | 11.50 | 3.50 | — | — |
| $H_2O$ | — | 13.30 | 17.00 | 8.75 | — | 10.50 | 1.00 | 7.50 | — |

Once at least one metal has been vapor-coated onto the surface of a glass having the composition defined hereinbefore, it is then necessary to heat the metal coating and said glass containing said coating to a temperature sufficient to cause the metal to migrate from the surface of said glass into the interior of the glass. The metals generally migrate to depths between about 10 and 2000 μm and generally up to about 3000 μm.

The temperature treatment following the formation of the metal top layer and for the residue-free incorporation of the metal into the glass surface is carried out in the absence of oxygen. In this way, oxidation of the metal on the glass surface is prevented. The oxidation is to be avoided in carrying out the process of this invention so that no residue will form on the surface of the glass being treated in accordance with this invention.

The heat treatment step is best carried out under vacuum generally about $10^{-2}$ to $10^{-7}$ mm Hg and preferably about $10^{-5}$ mm Hg without a protective gas atmosphere, although a protective gas atmosphere can be employed. Useful as protective gases are: nitrogen, argon, helium, forming gas ($N_2/H_2$) (9 to 1), hydrogen, and mixtures thereof.

Examples of tempering treatments are set forth in Table III. By reference thereof, the various process parameters including the nature of the protective gas and the time and temperature of the tempering step are set forth. In carrying out the process of this invention with the particular compositions set forth in the table, the heating of the metal coated glasses was conducted in a receptacle or in a reaction tube made of silica glass and was carried out by means of platinum resistance heating and the temperatures were measured with thermoelements (NiCr—Ni or Pt—PtRh). The depth of penetration of the metal was established with a microprobe (Stemens type) or in cases where this was not possible, by determining the refractive index on thin sections of the treated glass. Variations in the refractive index can be very accurately proven on such sections by using interference optics.

TABLE III

Selected examples for the tempering

| Composition (according to Table 2) | Metal in top layer | Tempering conditions | | | Depth of penetration of metal in μm |
|---|---|---|---|---|---|
| | | Time in h | Temperature in °C | Nature of protective gas | |
| 1 | Na | 2.00 | 476 | nitrogen | 350 |
| | Zn | 8.01 | 401 | nitrogen | 180 |
| | Na | 36.5 | 263 | argon | 250 |
| | Tl | 2.05 | 477 | vacuum | 150 |

TABLE III-continued
Selected examples for the tempering

| Composition (according to Table 2) | Metal in top layer | Tempering conditions | | | Depth of penetration of metal in μm |
|---|---|---|---|---|---|
| | | Time in h | Temperature in °C | Nature of protective gas | |
| 7 | Li | 0.30 | 700 | vacuum | 195 |
| | Pb | 16.10 | 386 | argon | 500 |
| | Ba | 1.05 | 602 | nitrogen | 150 |
| | Na | 1.12 | 450 | nitrogen | 450 |
| | Sr | 2.50 | 518 | vacuum | 200 |
| | K | 0.03 | 680 | vacuum | 120 |
| 13 | Mg | 14.32 | 400 | nitrogen | 210 |
| | Rb | 2.36 | 505 | argon | 375 |
| | Cs | 0.40 | 601 | argon | 365 |
| | K | 35.02 | 295 | nitrogen | 275 |
| | Cd | 10.01 | 420 | vacuum | 190 |
| | K | 0.50 | 807 | vacuum | 1020 |
| | Ca | 110.75 | 605 | vacuum | 370 |
| | Sr | 0.72 | 602 | vacuum | 180 |
| 18 | K | 19.5 | 504 | vacuum | 120 |
| | K | 0.06 | 1750 | vacuum | 875 |
| | Pb | 2.50 | 1750 | vacuum | 550 |
| | Pb | 14.61 | 1400 | nitrogen | 200 |

Glass parts or products of any desired shape, of which the properties had been changed from the surface by incorporation of the metals in accordance with the invention, can be further processed in many different ways. For example, glasses which have been modified in accordance with this invention can be shaped by various conventional techniques including, e.g., those used in the glass-blowing industry or by a lowering movement at elevated temperatures, the drawing of the glass into rods or tubes, pressing, rolling, collapsing, or by blowing. Thus, simple lenses can be produced from a round glass rod containing a top metal layer that has been vapor-coated onto its cylindrical surface, the metal having been subsequently introduced free from residue into the interior of a rod to a depth of 400 μm and thereby resulting in an increase in the refractive index within the effective range to a maximum by $\Delta n = 150 \times 10^{-4}$ as compared with the refractive index of the initial glass. The glass rods are then sawn into discs or slices with a thickness of 2 mm. The circular surfaces of these discs or slices with a thickness of 6 mm are polished and can then be used as simple lenses. They have the distinct advantage of having planar end faces and thus they can be easily combined in systems. The lenses produced are equivalent in their action to known gradient lenses produced by conventional ion-exchange techniques.

Another possible use regarding the further processing of glasses modified in accordance with this invention relates to the formation of a fiber from a tube. The tube is initially coated internally with a metal surface, and thereafter said metal is caused to migrate into the inside wall of the tube in accordance with this invention, without any residue remaining on the surface of the tube. The tube is then caused to collapse to form a rod. This is accomplished by application on a weak vacuum of 25 mm Hg in combination with heat at about the softening temperature of the glass, thereby enabling said rod to be pulled out to form a fiber. The interior of the latter fiber has thus become a light-conducting fiber due to the change caused by the incorporation of the metal into the inside wall of the tube resulting in a modification in the refractive index of the glass.

The residue-free incorporation of the metal from the top metal layer or surface into the interior of the glass is produced with a concentration profile that is reminiscent of known diffusion profiles. A statement concerning how the reaction between metal and glass, e.g., silica glass, can be stoichiometrically visualized is still not available. Based on a theoretical point of view, an oxygen deficiency is to be expected, i.e., a reduction of the entire glass after incorporation of the metal. An additional valence balancing is prevented according to the invention by the fact that, during the tempering step, no oxygen comes into contact with the metal surface of the glass. The tempering step takes place in accordance with the invention under vacuum or in a protective gas atmosphere as discussed hereinbefore. As a working hypothesis, it is assumed that an at least temporary valence balancing can be produced by polarization of the oxygen originally present in the glass.

The following examples are intended to describe, but not to limit the invention as described herein:

EXAMPLE 1

Using a conventional vapor-coating installation of the EDWARDS 6E4 type, about 1 gram of twice predistilled coarse-grain lead gravel was vapor-coated from a tungsten boat of the BALZERS W1type onto a partially covered glass substrate. The vapor-coating vacuum was $2 \times 10^{-5}$ mm Hg and, prior to the vapor-coating process, the installation was warmed with 10 mA under argon.

With respect to the substrate, this was a glass with the dimensions of $50 \times 50 \times 2$ mm and having the following composition:

| | Percent by Weight |
|---|---|
| $SiO_2$ | 69.00 |
| $B_2O_3$ | 0.50 |
| MgO | 0.45 |
| CaO | 6.90 |
| BaO | 2.35 |
| ZnO | 3.75 |
| $TiO_2$ | 0.30 |
| $Na_2O$ | 8.00 |
| $K_2O$ | 8.75 |

The glass substrate was intiially treated for 15 minutes in an ultrasonic bath with a 2% detergent solution, rinsed with distilled water, and dried with infrared radiators. A part of the substrate was covered with a mask and positioned 25 cm above the vaporizer source.

The lead gravel was caused to vaporize with 20 volts and 35 amps and deposited onto the substrate withon 60 seconds. The thickness of the lead layer was about 200 μm. The installation was thereafter flushed out with dry nitrogen and the coated specimen was then treated for 16 hours at 840°C in a reaction tube in the presence of a forming gas atmosphere consisting of 95% $N_2$ and 5% $H_2$.

After the tempering treatment, the substrate was completely vitreous, colorless and transparent. The lead surface layer present prior to the temperature treatment had disappeared without any residue remaining on the surface of the glass.

If a photographic paper is placed beneath the specimen and irradiation is carried out with X-rays ($10^3$ Rontgen) for 5 minutes, a blackening of the photographic paper is only obtained at those positions which were covered by the mask during the vaporization.

EXAMPLE 2

In a vapor-coating installation of the BALZERS BA 502 type, with a heatable substrate suspension arrangement, about 2.5 grams of zinc, in the form of rods, were vapor-coated from a molybdenum boat of the BALZERS M3 type at a vacuum of $9 \times 10^{116 \cdot 6}$ mm Hg onto a glass substrate. Prior to the vapor-coating process, warming was carried out for 10 minutes at 12 mA under air.

With regard to the glass substrate, this glass composition consists essentially of the following:

|  | Percent by Weight |
|---|---|
| $SiO_2$ | 80.00 |
| $B_2O_3$ | 11.50 |
| $Al_2O_3$ | 2.50 |
| $ZrO_2$ | 1.00 |
| BaO | 0.50 |
| $Na_2O$ | 3.50 |
| $K_2O$ | 1.00 |

The size of the glass substrate used is $80 \times 80 \times 4$ mm. The surface was initially ground, polished and cleaned with ether/alcohol (30/70) prior to its treatment in accordance with this invention.

The refractive index of the glass prior to treatment was 1.473. The glass substrate was arranged 45 cm above the vaporizer source and preheated to 200° C.

The zinc rods were caused to sublime with 15 volts and 13 amps and deposited onto the glass substrate, and left there to react with the glass for 124 hours at 270° C and $10^{-5}$ mm Hg.

After this reaction, the glass substrate was completely transparent. As a result of the zinc that was introduced into the glass, the refractive index of the substrate glass was raised to 1.507. No residues of zinc or zinc oxide were observed on the glass surface, whereas an enrichment of zinc in the operative zone inside the glass could be detected with the microprobe.

EXAMPLE 3

Using a vacuum vaporizer arrangement, consisting of an oil backing pump of the BALZERS type, a mercury diffusion pump manufactured by Schott and a vaporizing tube, metallic potassium was caused to vaporize and condense at a cooler position in said vaporizing tube.

The vaporizing tube used consisted of quartz glass manufactured by Schott and a vaporizing tube, metallic potassium was caused to vaporize and condense at a cooler position in said vaporizing tube.

The vaporizing tube used consisted of quartz glass manufactured by Heraeus of first-quality SUPRASIL. The length of the tube was 80 cm, the internal diamter was 2.5 mm and the external diameter 7.0 mm. At each of the two ends of the tube were two 14.5 mm ground sections fused thereon. By means of the latter sections, the tube was connected at one end to the vacuum apparatus and the other end of the tube was connected to a three-stage potassium pre-distillation from borosilicate glass (DURAN, made by Schott).

The tube initially cleansed in an ultrasonic bath (containing 2% detergent), rinsed with distilled $H_2O$ and dried with infrared radiators, was provided with a molybdenum ion getter with a length of 10 cm and purified in concentrated HCl, and connected to the vacuum plant and pre-distillation. The complete arrangement was flushed with repurified nitrogen (3 ppm $H_2O$) produced by Linde, and by breaking a quartz ampoule filled with highly pure potassium (about 2 g) produced by Merck, the metal to be vapor-coated onto the glass was introduced into the pre-distillation section.

By means of the backing pump, the installation was evacuated to $2 \times 10^{-2}$ mm Hg. Thereafter, the diffusion pump was switched on and the vapor frozen out on cooling fingers filled with liquid air. The vacuum reached was $5 \times 10^{-5}$ mm Hg. The tube was locally heated differently from 150° through 800° to 60° C and the potassium was driven into the tube by immersing the pre-distillation apparatus in a water bath at 100° C. In this bath, interfering anions were collected by the molybdenum rod and the potassium was deposited at the coldest point for the condensation. By the slow withdrawal of the heating arrangement, a uniform potassium surface or layer was produced. The distillation sump with ion getters was melted off by means of an oxyacetylene burner and the tube collapsed above the potassium surfaces, so that a hollow body about 10 cm long and coated internally with potassium formed with a vacuum in the region of $10^{-5}$ mm Hg. The tube was separated from the remainder of the installation and introduced into a Tammann furnace for 5 minutes at 1820° C. As a result, the potassium was incorporated into the silica glass tube to a depth of 350 μm and the tube was once again completely transparent. The tube was thereafter opened and collapsed at a vacuum of 25 mm Hg and at 1925° C and then pulled out into a fiber.

We claim:

1. A process for the treatment of glass for the purpose of varying properties of the glass, comprising the steps of applying a vapor-coating of at least one metal onto the surface of said glass and thereafter heating said metal coating and said glass substrate, in the absence of oxygen, to a temperature sufficient to cause said metal to migrate from the surface of said glass into said glass without any residue remaining on the surface of said glass.

2. The process of claim 1, comprising applying a thin coating of said metal onto the surface of said glass.

3. The process of claim 1, wherein said metal has a melting point of between 29° and 850° C and a vaporization point between 670° and 1527° C under normal pressure.

4. The process of claim 3, wherein said metal is an alkaline earth metal, an alkali metal, lead, cadmium, zinc, tellurium or mixtures thereof.

5. The process of claim 4, wherein said alkali metal is cesium, rubidium, lithium, sodium or potassium.

6. The process of claim 4, wherein said alkaline earth metal is magnesium, calcium, barium or strontium.

7. The process of claim 4, wherein said metal is lead, cadmium, zinc or tellurium.

8. The process of claim 1, wherein said metal has a difference of at least 390° C between the vaporization temperature and melting temperature of said metal.

9. The process of claim 8, wherein said metal has a vaporization temperature up to 1530° C.

10. The process of claim 1, wherein said glass contains from 40 to 100 weight percent $SiO_2$.

11. The process of claim 10, wherein said glass has the following composition:

|  | Weight Percent |
| --- | --- |
| $SiO_2$ | 40–100 |
| $B_2O_3$ | 0–30 |
| $P_2O_5$ | 0–11 |
| $Al_2O_3$ | 0–25 |
| $ZrO_2$ | 0–6 |
| $La_2O_3$ | 0–12 |
| MgO | 0–15 |
| CaO | 0–21 |
| SrO | 0–8 |
| BaO | 0–26 |
| ZnO | 0–20 |
| PbO | 0–50 |
| $TiO_2$ | 0–20 |
| $Li_2O$ | 0–15 |
| $Na_2O$ | 0–30 |
| $K_2O$ | 0–35 |

12. The process of claim 1, comprising heating said metal coating at a temperature between 260° and 1850° C and for a time between 1 minute and 136 hours in the absence of oxygen.

13. The process of claim 1, comprising applying a coating of said metal onto said glass by condensing said metal from the vapor phase.

14. The process of claim 1 further comprising the step of shaping said glass into a desired form.

15. The process of claim 14, wherein said glass is shaped by lowering movement at elevated temperature, by pulling said glass into rods and tubes, by pressing, rolling, collapsing or by glass-blowing.

16. The process of claim 1, wherein said glass is in the form of a rod having plane surfaces and further comprising the steps of sawing said rod into discs, and polishing said discs thereby forming a lens.

* * * * *